United States Patent [19]

MacMurray

[11] Patent Number: 5,304,038
[45] Date of Patent: Apr. 19, 1994

[54] BUILT-UP MARINE PROPELLER BLADE BALANCING

[75] Inventor: Peter J. MacMurray, Holliston, Mass.

[73] Assignee: Bird-Johnson Company, Walpole, Mass.

[21] Appl. No.: 897,996

[22] Filed: Jun. 16, 1992

Related U.S. Application Data

[63] Continuation-in-part of Ser. No. 817,476, Jan. 3, 1992, abandoned.

[51] Int. Cl.$^5$ ............................................. B64C 11/26
[52] U.S. Cl. .................................. 416/144; 416/145; 416/500; 73/456
[58] Field of Search ............... 416/144, 145, 229 R, 416/500; 73/456, 455, 468

[56] References Cited

U.S. PATENT DOCUMENTS 3,999,888 12/1976 Zincone .
4,489,605 12/1984 Kops .

Primary Examiner—Edward K. Look
Assistant Examiner—Mark Sgantzos
Attorney, Agent, or Firm—Brumbaugh, Graves, Donohue & Raymond

[57] ABSTRACT

A blade of a built-up marine propeller is balanced by forming an open cavity of a predetermined size at a predetermined location proximate to the blade tip, conducting a spin-balancing test in which the blade being balanced and a calibration blade are assembled diametrically opposite each other on a dummy hub to form a simulated two-blade propeller, determining from the test the weight that must be added to the blade to balance the simulated propeller, and affixing a balance member of a predetermined weight in the blade cavity. A cover plate is secured in the cavity opening of the blade in sealed relation, and the external surface of the cover plate is ground to make it fair to the profile of the portion of the blade face adjacent the cavity opening.

14 Claims, 2 Drawing Sheets

BUILT-UP MARINE PROPELLER BLADE BALANCING

This application is a continuation-in-part of U.S. patent application Ser. No. 07/817,476 filed Jan. 3, 1992, and entitled "Controllable Pitch Propeller Blade Balancing," now abandoned.

BACKGROUND OF THE INVENTION

Marine propellers are sometimes constructed by fastening individually fabricated blades to a hub. This is always the case with controllable pitch propellers (CP propellers) and can also be the case with propellers having fixed blades. The term "built-up marine propeller" will be used herein to refer to both CP and fixed-blade marine propellers in which individual blades are fabricated separately and are fastened to a hub.

Like any rotating device, it is important that a marine propeller be dynamically balanced to minimize vibration and thereby prevent undesirable loadings of the propeller components, the ship's shafting, and the shaft bearings and their mounts, and minimize noise. At one time, the blades of built-up marine propellers were hand-finished and were balanced against a standard blade weight by removing material from the blade surfaces. The resulting blades often deviated somewhat from the desired profile, which resulted in small, but nonetheless undesirable, differences in hydrodynamic performance among the blades.

With the advent of computer numerically controlled (CNC) 5-axis milling machines, it became possible and highly advantageous to finish the blades with such machines, which enables the blade surfaces to be highly accurate. CNC machine-finished blades, accordingly, require relatively small balance corrections, and such corrections have heretofore been made by providing a cavity on the side of the blade flange that faces the propeller hub and installing in the cavity lead balance members specially fabricated to a have a weight that is determined from a spin-balancing test, i.e., a test in which a simulated propeller consisting of a dummy hub and a set of blades installed on the dummy hub in a configuration corresponding to the actual propeller in which the blade will be used is spun (rotated) and the parameters (direction and magnitude) of the imbalance are determined. The locations and the amounts of the lead balance members required to balance the simulated propeller are calculated from the test results. The balance members are fabricated and installed on the blade flanges as required, which involves removing the blades from the dummy hub. The blades are reinstalled, the spin-balancing test is repeated, and any further balance adjustments are made by altering the balance members.

The effect on the balance of the propeller of installing balance members on the propeller blades is, of course, a function of the masses of the balance members and the distances of the balance members from the axis of rotation of the propeller. When balance members are installed in the blade flanges, the distance from the propeller axis is relatively small, and balance members with relatively large masses (high weights) are required. To minimize the masses of the balance members, it has been conventional to balance the propeller blades in sets and to install them as sets on the propeller. For both balancing and installation, the blades are arranged in a sequence, based on their weights, that will make the propeller most closely balanced before balance members are added and minimize the sizes and the number of balance members required to achieve balance. An important disadvantage of balancing the blades in sets is that they have to be used in sets. If one or more, but less than all, of the blades of a propeller have to be changed for some reason, it is necessary to change the whole set.

SUMMARY OF THE INVENTION

An object of the present invention is to provide a built-up marine propeller that does not require blades that are either tested or installed as a set and, instead, incorporates blades that are standardized to a close tolerance as to balance so that any blade can be interchanged with all other blades of its type. Another object is to facilitate the procedure for balancing the blades of built-up marine propellers. Yet another object is to reduce the time required to balance built-up marine propeller blades and commensurately reduce the cost of the procedure. It is also desired to provide a weight-savings in the propeller by minimizing the weight added to the blades to achieve balance.

The foregoing objects are attained, according to the present invention, by a built-up marine propeller (i.e., a propeller having a hub and a multiplicity of individually fabricated propeller blades mounted on the hub) in which each blade has a cavity that is located proximate to the blade tip and has an opening at one face of the blade, a balance member of a predetermined weight is received in the cavity of at least one blade—it is entirely possible that some of the blades produced will balance without adding balance members—and is affixed to the blade, and a cover plate is received in the cavity opening of each blade, is secured to the blade in sealed relation and has an external surface fair to the profile of the blade face adjacent the cavity opening.

In a preferred embodiment, the cavity of each blade is bounded by a circular cylindrical outer wall, and the balance member received in the cavity is a ring having a circular cylindrical outer wall forming a close fit with the peripheral wall of the cavity. The close fit between the balance member and the cavity outer wall fixes the location of the balance member. The balance member is secured in the cavity by tack welds, and the cover plate is secured to the blade by a seal weld that extends entirely around the perimeter of the cover plate. The weight of the balance member in the blade cavity is predetermined by calculations from a spin-balancing test in which the blade and a calibrated blade are mounted in diametrically opposed relation on a dummy hub.

Advantageously, the cavity is annular and has a base wall that is engaged by the balance member, a circular cylindrical outer wall and a circular cylindrical inner wall, the inner wall being on a boss that extends from the base toward the blade face. The balance member is an annular ring having circular cylindrical inner and outer walls forming close fits with the inner and outer walls, respectively, of the cavity.

The cavity is, preferably, on the pressure face of the blade so that the pressure forces on the cover tend to hold it on the blade. The end of the boss engages the face of the cover plate to enhance the support of the cover plate against deformation under the pressure. The cover plate may have a hole in register with the end of the boss, and a plug weld in the hole in the cover plate joins the cover plate to the boss and fills the hole. Also, the blade may have an annular shoulder adjacent the cavity opening that is recessed into the blade face and is engaged by the cover plate along a portion at the perimeter of the cover plate, again for enhanced pressure load support of the cover plate.

A convenient way to make the balance members is to cut them from a tubular blank having concentric inner and outer circular cylindrical walls adapted to form the close fits with the inner and outer walls of the cavity. The blank is, of course, cut so that the balance member has a thickness that results in the predetermined weight.

According to another aspect of the invention, there is provided method of balancing a blade of a built-up marine propeller comprising the steps of forming a cavity proximate to the blade tip, the cavity having an opening at one face of the blade, and conducting a spin-balancing test in which the blade and a calibration blade are assembled diametrically opposite each other on a dummy hub to form a simulated two-blade propeller. The weight that must be added to the blade to balance the simulated propeller is determined from the test, and a balance member of that weight is installed in the blade cavity and affixed to the blade. A cover plate is installed the cavity opening of the blade in sealed relation, and the external surface of the cover plate is ground to make it fair to the profile of the portion of the blade face adjacent the cavity opening. A final balance test on the balanced blade is then conducted.

In practice, a cavity of the same size as the cavities of all blades of the type being produced is machined in each blade while it is set up in the CNC 5-axis machine for finishing. The cavity is made large enough to accept the amount of weight required to balance the lowest-weight blades likely, on a statistical basis, to be produced. The calibration blade will, of course, be a blade having the largest weight likely to be produced, so that the heaviest blades to be balanced against it will balance without having to be lightened in some way, such as by enlarging the cavity. The calibration blade may itself be made heavy by adding a balance weight to it. In practice, the amount of weight added to the lightest blades produced to balance them with the heaviest blades is not likely to be more than of the order of one percent of the blade weight.

For a better understanding of the invention, reference may be made to the following description of an exemplary embodiment, taken in conjunction with the accompanying drawings.

DESCRIPTION OF THE EMBODIMENT

Figure 1:
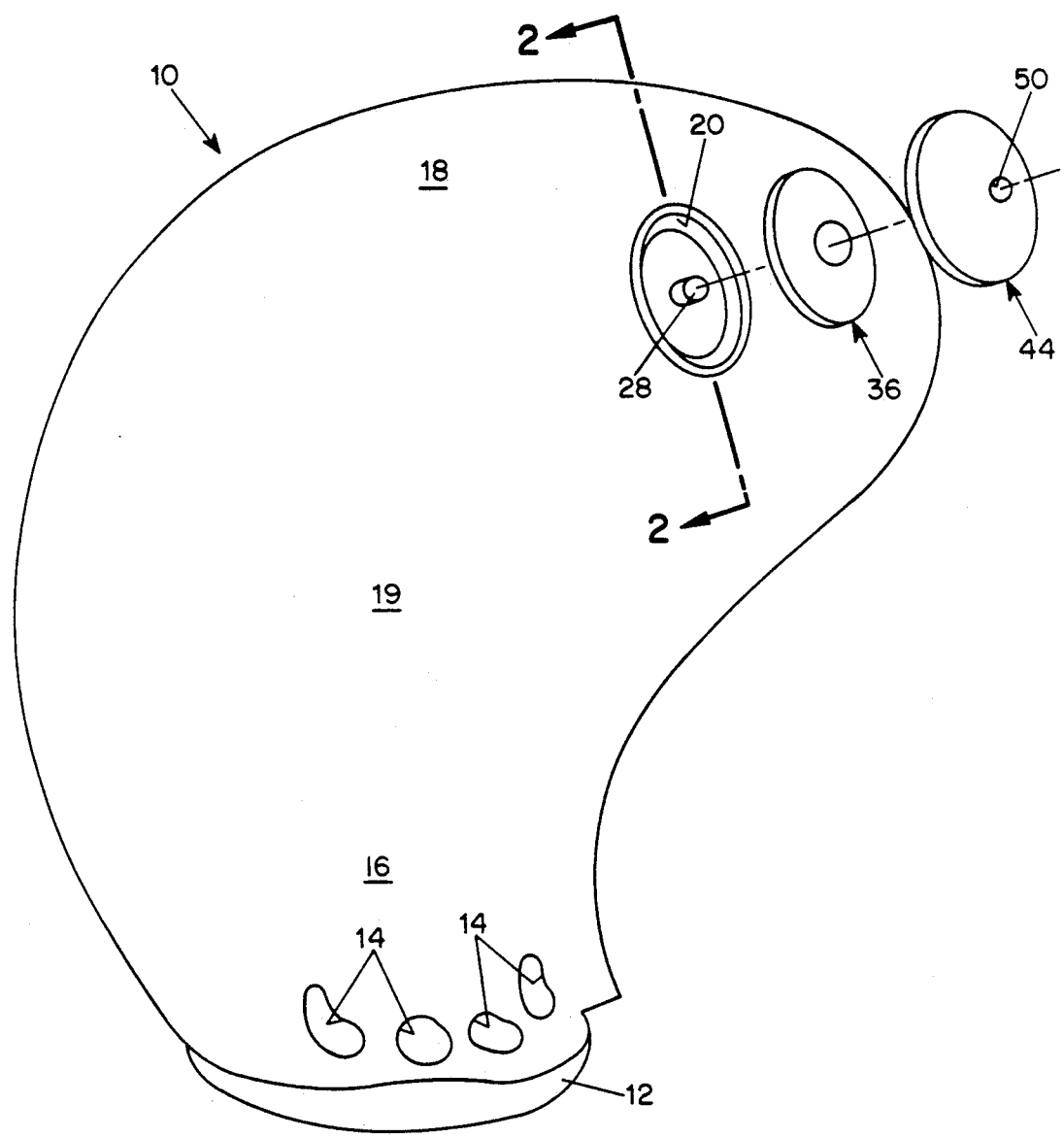
FIG. 1 is an exploded pictorial view of a CP propeller blade embodying the invention.
Figure 2:
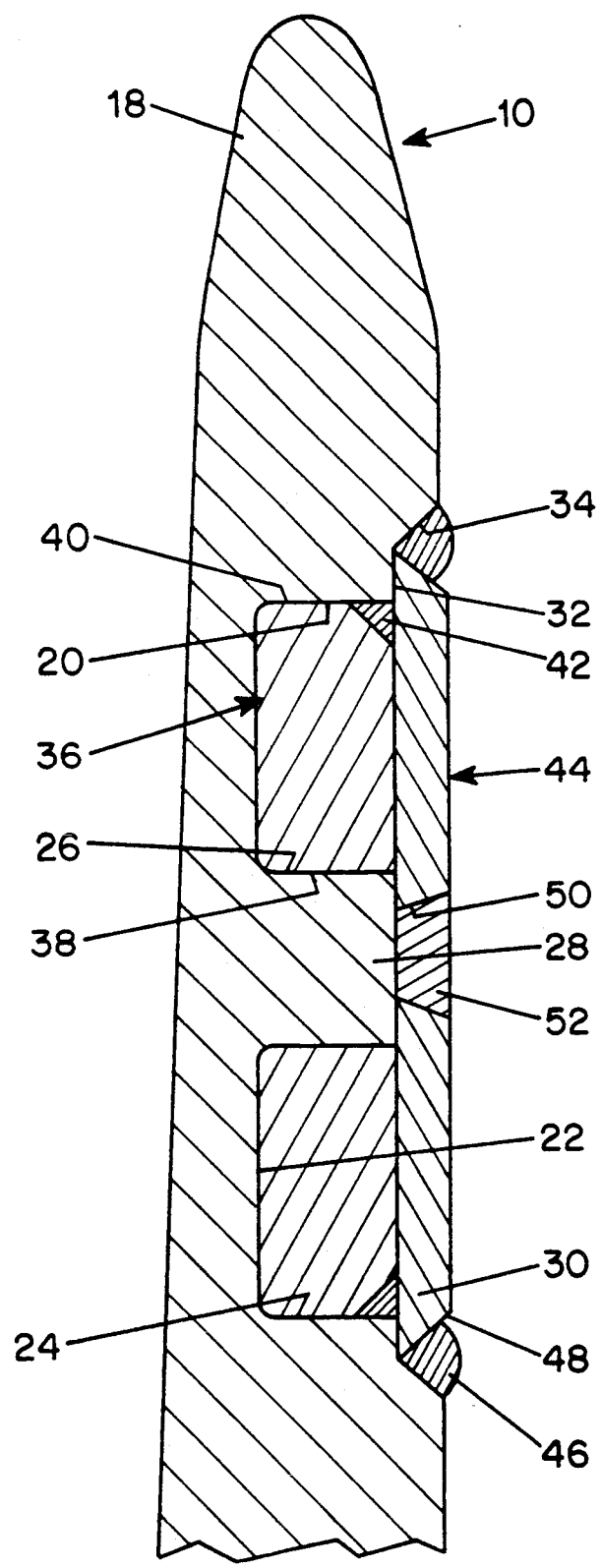
FIG. 2 is a cross-sectional view of the tip portion of the blade of FIG. 1, showing the balance members and cover plate installed in the cavity.

A typical blade 10 of a CP propeller consists of a circular flange 12 having circumferentially spaced-apart bolt holes 14 for the bolts (not shown) by which it is attached to a crank ring (not shown) on the propeller hub, a root portion 16 adjacent the flange, a tip portion 18, which is the part of the blade farthest from the axis of rotation of the propeller, and a body portion 19, which constitutes the major part of the blade. FIG. 1 views the pressure face (i.e., the aftward face) of the blade 10. CP propeller blades are manufactured individually by first casting a blank from a suitable bronze alloy and then finishing the blade to a very close tolerance using a CNC 5-axis milling machine. Despite the accuracy of the finishing, small variations in finished blade weights and blade centers of gravity, due to small variations in the density of the material and tolerance variations in finishing, are unavoidable. Therefore, the blade sets of a CP propeller have to be dynamically balanced.

In accordance with the present invention, all blades produced are formed with cavities 20 of the same size and at the same predetermined location proximate to the blade tip portion. The size of the cavity for a given blade design is chosen on the basis of the expected variation in weight in the blades produced and calculations of the maximum amount of weight to be added to the lightest blades at the location selected for the cavity to balance them with the heaviest blades that are likely to be produced. If the blades of the same design were previously produced, the weight variations will be known. Otherwise, the probable weight variation can be estimated fairly closely using weight data from other blades.

From both logic and experience, it is known that the largest blade-to-blade variations in weight and balance occur near the blade tip, which is of a large area, a large distance from the propeller axis, and relatively thin, especially near the trailing edge. All of these factors contribute to and magnify the effect of machining errors in the tip portion, as compared to other portions of the blade. Because of the blade skew and the fact that it is angled to the propeller axis at normal full ahead pitch, the optimum location for adding weight to the blade to balance it is near the tip and offset several degrees, say about 20 degrees, circumferentially from the spindle axis in the direction of the trailing edge. In such a location, close to a minimum amount of weight has to be added to attain a given dynamic balance correction.

In the embodiment, the cavity 20 is annular and has a planar base wall 22, a circular cylindrical outer wall 24 and a circular cylindrical inner wall 26, the inner wall being on a boss 28 extending from the base toward the blade face. The outer wall 24 of the cavity defines an opening 30 at the blade face. Adjacent the opening are a shoulder 32 that is recessed into the blade from the face and a bevel 34. (In FIG. 1, the cavity 20 and the components associated with it are greatly enlarged, for a clearer illustration.) The cavity is created by machining it when the blade is set up in the CNC milling machine for finishing. The particular shape of the cavity is relatively unimportant, but is desirable, from the standpoint of keeping the calculations of the required balance member simple, that it be symmetrical about an axis such that the center of gravity of balance members installed in it is fixed. A cylindrical shape meets that requirement, and also has the advantage of being easy to accurately machine, not only in the cavity but on the balance members.

After a blade is finished, it is balanced by a spin-balancing test. That test involves installing the blade and a calibration blade in diametrically opposed positions on a dummy hub, thereby simulating a two-blade propeller, in a spin-balance machine. The results of the test are data from which the amount of weight, if any, required to be added to the test blade to balance it with the calibration blade can be calculated. The nature of the calculations is well known in the art and requires no description here. The calibration blade is, of course, a previously produced blade of the same design as the blade being balanced and is a "heaviest blade," i.e., a blade that as finished is the heaviest likely to be produced or has balance members incorporated to make it dynamically equivalent to the heaviest blade likely to be produced.

Based on the calculated weight required to be added to the blade at the location of the cavity, a balance member having the required weight is produced and installed in the cavity. The balance member should be shaped and dimensioned with respect to the cavity that receives it so that it is fixed in place by engagement with one or more walls of the cavity. For the circular cavity of the embodiment, a circular balance member is desirable, and the circular shape also provides the same center of gravity for all weights of balance members and is easy to make.

The balance member 36, in the illustrated embodiment, is an annular ring having circular cylindrical inner and outer walls 38 and 40 forming close fits with the inner wall 26 and the outer wall 24, respectively, of the cavity 20. A convenient way to make the annular balance members 36 is to cut them from a tubular blank having the required inner and outer diameters. The thickness of the piece cut from the blank establishes its weight. After the new blade being balanced has been spin-balance tested and the weight required to balance it calculated, a balance member having the required weight can quickly and easily be cut from the blank and installed in the blade cavity. The balance member is, preferably, made of the same material as the blade and is welded in place in the cavity by tack welds 42.

Another convenient form of balance member is a set of concentric rings nested one within the other in a range of standard weights that are produced and held in stock. One or more weights are selected that add up to slightly more than the required weight, and material is removed from one of the them to yield a set having the required total weight.

After the required balance member is installed in the cavity, a cover plate 44 is placed over the cavity and fastened to the blade by a seal weld 46 that extends entirely about its perimeter. A prepared site for the weld 46 is provided by the bevel 34 of the blade and a bevel 48 on the cover plate.

It is desirable, but by no means essential, to locate the cavity on the pressure face of the blade so that the cover plate is loaded in compression against the blade rather than in tension away from the blade. The purpose of the boss 28 of the cavity is to enhance the load-bearing support of the cover plate, which engages the end of the boss. As shown, the cover plate has a hole 50 that registers with the boss, and a plug weld 52 joins the cover plate to the boss and also fills the hole. Further load support for the cover plate is provided by engagement of the perimeter of the cover plate with the shoulder 32 that borders the cavity opening. The cover plate can be installed on the blade while the blade remains set up in the balance machine. After the cover plate is installed, it and the welds are ground fair to the portion of the blade surrounding it, which can also be done with the blade in the balance machine. The now balanced blade is then subjected to a final balance test.

Before the cover plate is installed, a spin-balancing test of the simulated propeller after the balance member is installed in the blade being balanced can be performed and the weight that must be added to the blade to balance the simulated propeller determined. The weight that must be added is compared to the weight of the cover, and if it is not comparable within a predetermined tolerance, the weight of the balance member in the blade cavity can be altered. In most cases, this intermediate test should be unnecessary.

I claim:

1. In a dynamically balanced, built-up marine propeller having a hub and a multiplicity of individually fabricated propeller blades mounted on the hub body, the improvement in which each blade has a cavity that is located proximate to the blade tip and has an opening at a face of the blade, each blade being dynamically balanced by having been subjected to a spin-balancing test in which only it and a calibration blade having a weight not less than the maximum weight of the heaviest blade of the propeller were mounted in diametrically opposed relation on a dummy hub to produce substantially identically balanced blades, a balance member of a predetermined weight is received in the cavity of at least one blade and is affixed to the blade, said predetermined weight being calculated from the spin-balancing test of said at least one blade, and a cover plate is received in the cavity opening of each blade, is secured to the blade in sealed relation and has an external surface fair to the profile of the blade face adjacent the cavity opening.

2. The improvement according to claim 1 in which the cavity of each blade is bounded by a circular cylindrical peripheral wall, and the balance member received in the cavity of said at least one blade is a ring having a circular cylindrical outer wall forming a close fit with the peripheral wall of the cavity.

3. The improvement according to claim 1 in which the balance member is secured to the blade by tack welds.

4. The improvement according to claim 1 in which the cover plate is secured to the blade by a seal weld entirely around the perimeter of the cover plate.

5. The improvement according to claim 1 in which the cavity is defined by a circular cylindrical outer peripheral wall, and the balance member is a disc having a circular cylindrical outer wall forming a close fit with the peripheral wall of the cavity.

6. The improvement according to claim 1 in which the cavity is annular and has a base wall, a circular cylindrical outer wall and a circular cylindrical inner wall, the inner wall being on a boss extending from the base toward the blade face, and the balance member is an annular ring having circular cylindrical inner and outer walls forming close fits with the inner wall and the outer wall, respectively, of the cavity.

7. The improvement according to claim 6 in which the end of the boss engages the face of the cover plate.

8. The improvement according to claim 6 in which the cavity is on the pressure face of the blade, the end of the boss engages the face of the cover plate, the cover plate has a hole in register with the end of the boss, and a plug weld in the hole in the cover plate joins the cover plate to the boss and fills the hole.

9. The improvement according to claim 8 in which the blade has an annular shoulder adjacent the cavity opening that is recessed into the blade face and is engaged by the cover plate along a portion at the perimeter of the cover plate.

10. The improvement according to claim 6 in which the balance member is a piece cut from a tubular blank having concentric inner and outer circular cylindrical walls adapted to form the close fits with the inner and outer walls of the cavity, the member being cut to a thickness such that it has the predetermined weight.

11. A method of balancing a blade of a built-up marine propeller to produce a blade substantially identically balanced and interchangeable with all other blades of the propeller, comprising the steps of forming a cavity proximate to the blade tip, the cavity having an opening at one face of the blade, conducting a spin-balancing test in which only the blade and a calibration blade are assembled diametrically opposite each other on a dummy hub to form a simulated two-blade propeller, determining from the test the weight that must be added to the blade to balance the simulated propeller, installing a balance member of a predetermined weight in the blade cavity and affixing it to the blade, installing a cover plate in the cavity opening of the blade in sealed relation, and grinding the external surface of the cover plate to make it fair to the profile of the blade face adjacent the cavity opening.

12. A method according to claim 11 in which the balance member and cover plate are installed and the surface of the cover plate is ground fair while the blade remains installed in the simulated propeller, and a final spin-balance test is conducted thereafter.

13. A method of manufacturing blades for a multiplicity of built-up marine propellers of the same design in which the blades are substantially identically balanced and interchangeable among all propellers of that design comprising the steps of producing a calibration blade having a weight that is not less than the weight of the heaviest of all blades of the multiplicity likely to be produced, and for each blade produced, forming a cavity proximate to the blade tip, the cavity having an opening at one face of the blade, conducting a spin-balancing test in which only the blade being produced and the calibration blade are assembled diametrically opposite each other on a dummy hub to form a simulated two-blade propeller, determining from the test the weight that must be added to the blade to balance the simulated propeller, installing a balance member of a predetermined weight in the blade cavity and affixing it to the blade, installing a cover plate in the cavity opening of the blade in sealed relation, and grinding the external surface of the cover plate to make it fair to the profile of the blade face adjacent the cavity opening.

14. A method according to claim 13 in which the balance member and cover plate are installed and the surface of the cover plate is ground fair while the blade being produced remains installed in the simulated propeller, and a final spin-balance test is conducted thereafter.

* * * * *